No. 846,264. PATENTED MAR. 5, 1907.
C. C. TYLER.
CONVERTIBLE FORK AND RAKE.
APPLICATION FILED JULY 14, 1906.
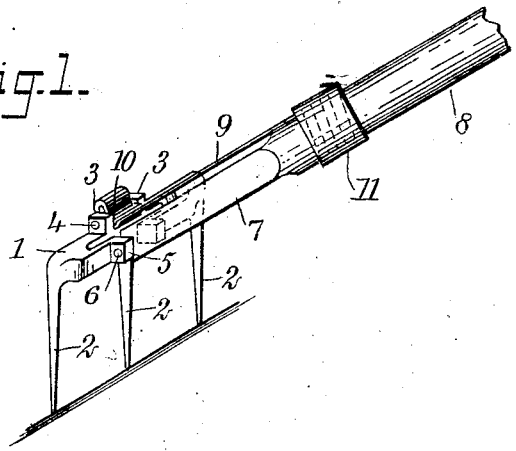
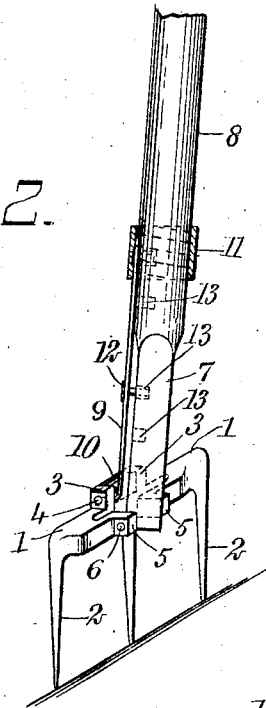
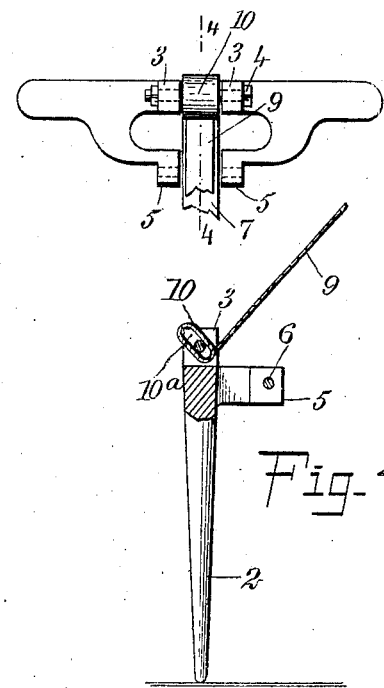
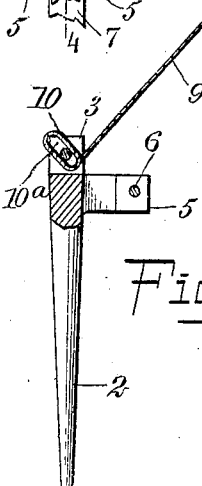
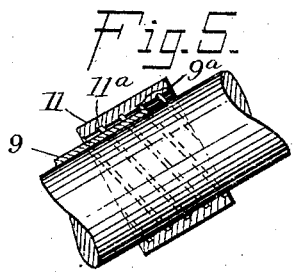
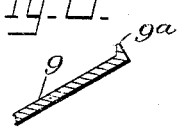
WITNESSES
INVENTOR
Charles C. Tyler
BY
ATTORNEYS

UNITED STATES PATENT OFFICE.

CHARLES COTTEN TYLER, OF ANNETA, NORTH CAROLINA.

CONVERTIBLE FORK AND RAKE.

No. 846,264.  Specification of Letters Patent.  Patented March 5, 1907.

Application filed July 14, 1906. Serial No. 326,259.

*To all whom it may concern:*

Be it known that I, CHARLES COTTEN TYLER, a citizen of the United States, and a resident of Anneta, in the county of Hertford, and State of North Carolina, have invented a new and Improved Convertible Fork and Rake, of which the following is a full, clear, and exact description.

My invention relates to a tool adapted to serve as a fork or rake and to be readily converted from one form to the other, and has for its object to provide a tool of this character so constructed as to enable straight prongs to be used and adapted to hold straw or hay when used as a fork as readily as if the prongs were curved, and thereby dispense with the disadvantages arising from the use of curved prongs on a tool of this character when used as a rake.

A further object of my invention is to provide a suitable brace adapted to hold the handle of the tool firmly in position when adjusted as a fork or rake and enable the parts to be readily changed from one form of implement to the other.

These objects I accomplish by the means illustrated in the accompanying drawings, in which drawings like characters of reference indicate like parts throughout the several views, and in which—

Figure 1 is a perspective view of a device embodying my invention arranged as a rake. Fig. 2 is a perspective view of the device shown in Fig. 1 arranged to serve as a fork. Fig. 3 is a plan view of the rake-head with brace-bar and handle partly broken away. Fig. 4 is an end view, partly in section, showing the rake-head and brace. Fig. 5 is a longitudinal section of a sleeve and part of the brace mounted upon a section of a handle shown in elevation, and Fig. 6 is a longitudinal section of the end of a brace.

As illustrated in the drawings, a handle 8 is provided with a shank 7, which is pivotally attached, by means of pins 6, to lugs 5, formed on a rake-head. The rake-head comprises a top or cross bar 1, having straight prongs 2, extending at right angles to said cross-bar. Lugs 3 are formed on top of the cross-bar 1, having a pin 4 extending from one lug to the other. A brace-bar 9 extends along the upper surface of the shank 7 of the handle. The shank of the handle is provided with apertures 13, adapted to receive pins or bolts 12, secured to the brace-bar, by means of which the brace-bar and handle may be adjusted relatively to each other. One end of the bar 9 is provided with a spur or projection $9^a$, which engages the interior spiral groove $11^a$, formed in a sleeve 11. The sleeve 11 holds the end of the brace securely to the handle 8, and by means of the spiral groove formed on the inner side of the sleeve which engages the spur $9^a$ of the brace 9 the sleeve is provided with a locking engagement with the end of the brace and prevents its removal from the end of the brace unless so desired. The opposite end of the brace 9 is offset from the body of the brace to form an arm 10, which is provided with an elongated slot $10^a$, extending through the offset end of the brace 9. The slot $10^a$ of the offset end of the brace engages the pin 4, secured to the lugs 3, formed on the top of the rake-head, and by means of such slot formed in the offset end of the brace 9 the pin 4 bears against the top end of the slot $10^a$ when the handle is adjusted in the plane of the rake-head to form a fork, as shown in Fig. 2. When the handle is arranged at an angle to the rake-head, however, to form a rake, as shown in Fig. 1, the pin 4 engages the bottom portion of the slot $10^a$, formed in the arm 10.

When used as a rake or fork, the brace-bar 9 at all times bears against the surface of the shank 7 of the handle 8, thereby holding the handle firmly in the position in which it is set. When it is desired to change the tool from a rake to a fork, the sleeve 11 is removed from the end of the brace 9 and the brace separated from the handle by drawing outward the free end of the brace, so as to remove the pins or bolts 12 from the sockets 13, formed in the handle. The handle may then be turned on the pivot 6 so as to bring the handle and rake-head in the same plane as shown in Fig. 5. The brace-bar 9 is then brought in contact with the handle, the pins 12 attached to the handle-engaging recesses or apertures 13 farther removed from the end of the shank of the handle than when the handle is arranged to form a rake. The sleeve 11 is then brought over the end of the brace-bar and rotated on the handle, so as to engage the threads of the sleeve with the spur $9^a$, formed on the end of the brace-bar. Although the offset end of the brace-bar is freely secured to the pin 4, attached to the lugs 3 on the top of the rake-head, the offset end 10 of the brace-bar bears against the top of the rake-head whether the parts be arranged to serve as a fork or rake, thereby bracing the handle firmly on the rake-head, at the same time providing an adjustable connection between the brace-bar and the rake-head. By means of such construction a device is produced which is strong and durable and adapted to be used with equal advantage either as a rake or fork.

Having thus described my invention, what I claim as new, and desire to secure by Letters Patent, is—

1. The combination with a rake-head, of a handle pivoted to the side of the rake-head, a brace bearing against the handle, adjustable longitudinally on the handle, and provided on one end with a spur and on the opposite end with an offset arm bearing against the top of the rake-head and adjustably secured thereto, and a sleeve having a locking engagement with the opposite end of said brace, substantially as shown and described.

2. The combination with a rake-head, of a handle pivoted to the side of the rake-head, a brace bearing against the handle, adjustable lengthwise thereon, and provided on one end with an offset arm having a slot formed therein engaging a pin secured to the top of the rake-head, and a sleeve having a locking engagement with the opposite end of the brace, substantially as shown and described.

3. The combination with a rake-head, of a handle pivoted thereto, a brace bearing against the handle, adjustable lengthwise thereof, and provided with an offset forward end bearing against the top of the rake-head and adjustably secured thereto, the opposite end of said brace being provided with a spur and a sleeve having an interior spiral groove engaging the spur formed on the end of the brace, substantially as shown and described.

In testimony whereof I have signed my name to this specification in the presence of two subscribing witnesses.

CHARLES COTTEN TYLER.

Witnesses:
J. A. LASSITER,
W. H. MODLIN.